June 26, 1962            M. A. SALTZ            3,040,328
APPARATUS FOR INSERTING HOOKS IN DRAPERY AND THE LIKE
Filed Nov. 14, 1960            3 Sheets-Sheet 1
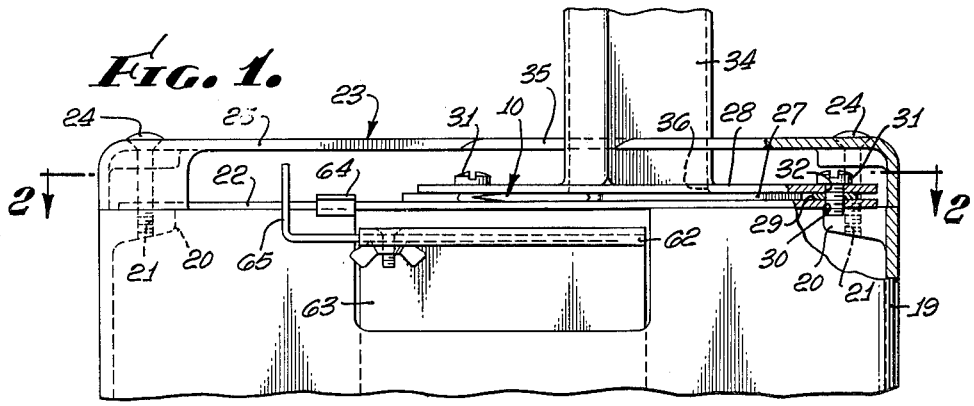
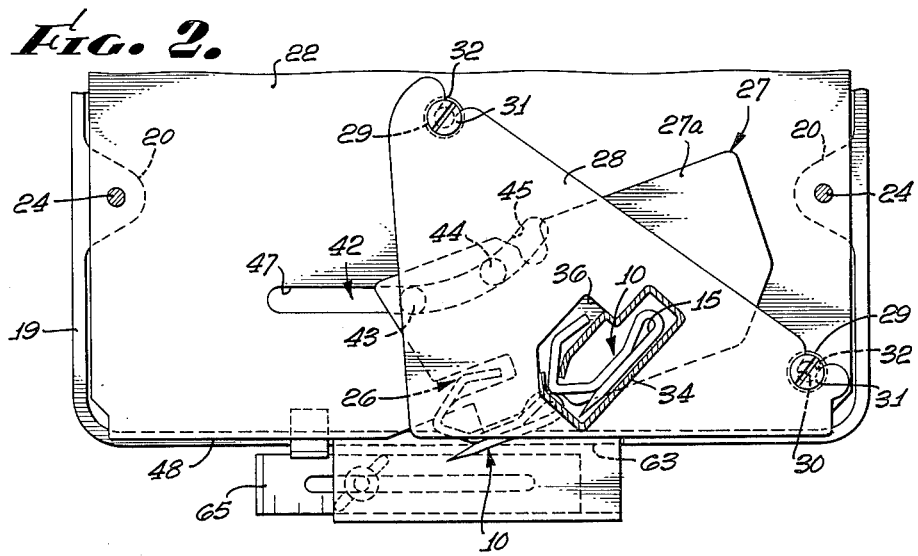
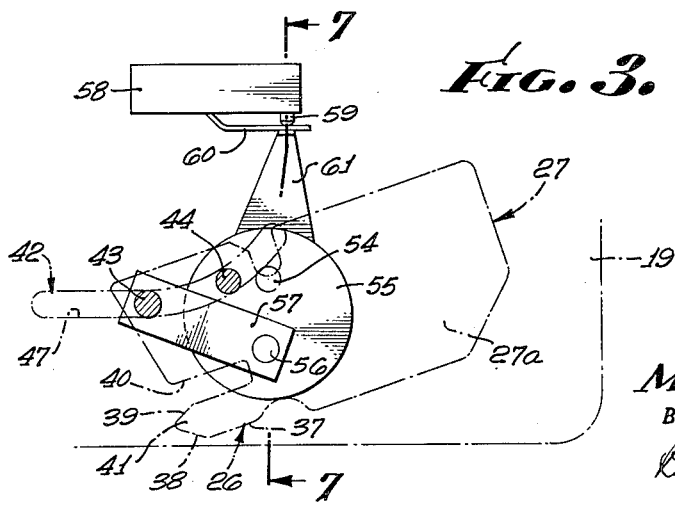
INVENTOR.
MORRIS A. SALTZ
BY
Bernard Kriegel
ATTORNEY.

June 26, 1962 M. A. SALTZ 3,040,328
APPARATUS FOR INSERTING HOOKS IN DRAPERY AND THE LIKE
Filed Nov. 14, 1960 3 Sheets-Sheet 2
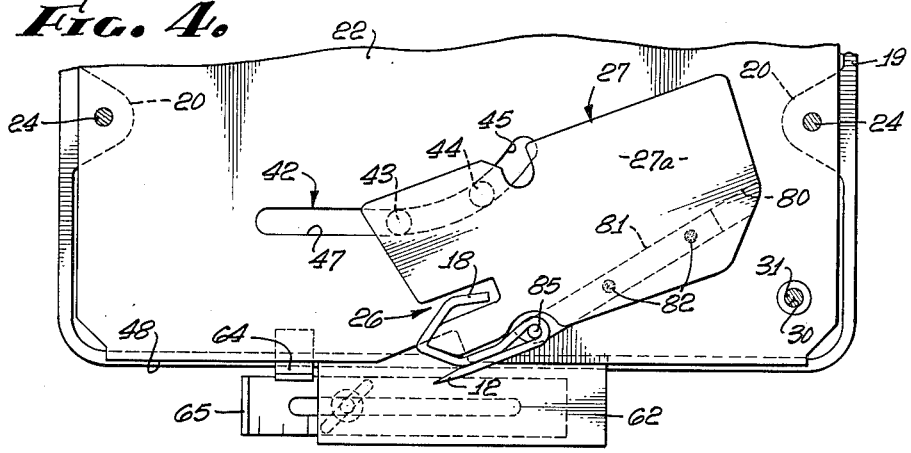
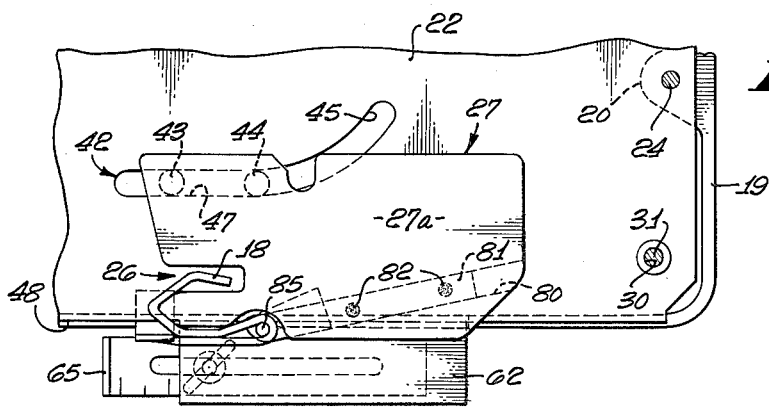
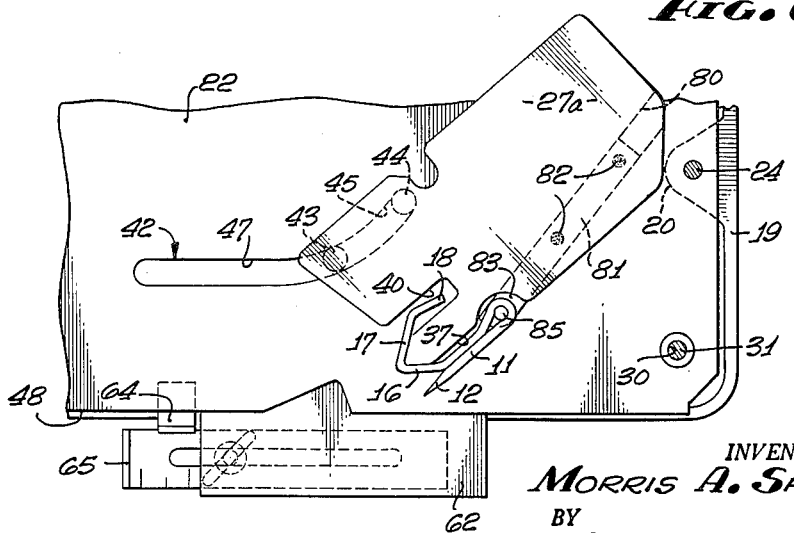
INVENTOR.
MORRIS A. SALTZ
BY
Bernard Kriegel
ATTORNEY.

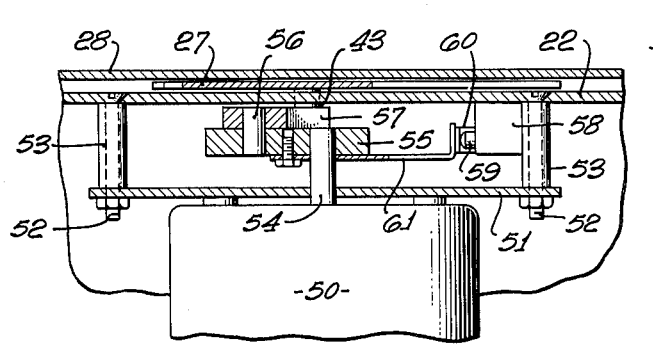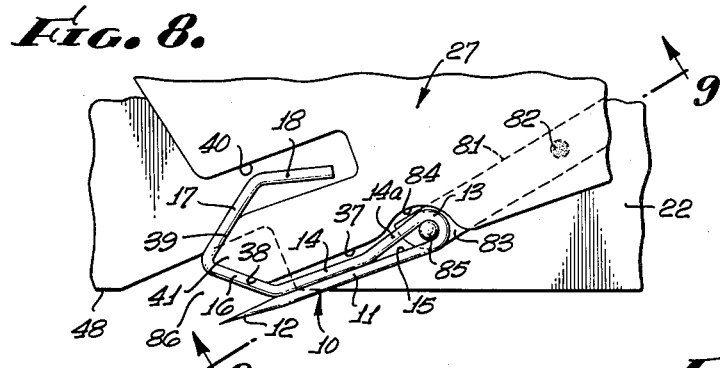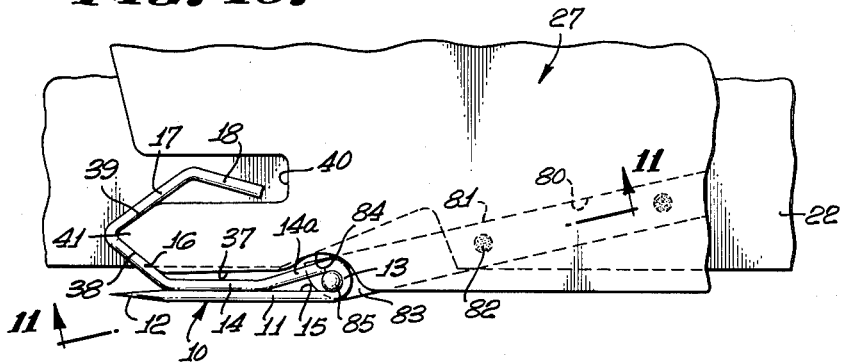

United States Patent Office 3,040,328
Patented June 26, 1962

3,040,328
APPARATUS FOR INSERTING HOOKS IN
DRAPERY AND THE LIKE
Morris A. Saltz, 1083 S. Ogden Drive,
Los Angeles 19, Calif.
Filed Nov. 14, 1960, Ser. No. 68,773
19 Claims. (Cl. 1—346)

The present invention relates to apparatus for inserting pin hooks in drapes, curtains, and similar devices, for the purpose of hanging them appropriately from a suitable support.

Heretofore, drive devices have been provided for inserting pin hooks in drapery, and the like. In inserting a pin hook, the pin portion is at first disposed at an angle to the drapery to secure its penetration into the latter. However, the bearing action of the pin point against the drapery tends to rock or tilt the hook relative to the drive device, so that the forward portion or pin point is placed at a flatter angle to the drapery, which might preclude entry of the pin portion into the drapery during the operation of the drive device.

Accordingly, an object of the present invention is to provide an apparatus for inserting pin hooks in drapery, and the like, in which the pin hook is prevented from rocking or tilting relative to the drive member during its insertion in the drapery, insuring proper entry of the pin point thereinto, followed by appropriate full disposition of the pin portion in the drapery.

Another object of the invention is to prevent the loop or web portion of a pin hook from rocking or tilting with respect to its drive member and toward the drape during insertion of the pin portion of the hook in the drape, thereby insuring proper penetration of the pin portion into the drape.

A further object of the invention is to provide an apparatus for inserting pin hooks in drapery, and the like, in which the loop or web portion of the pin hook is retained against the drive member of the apparatus during movement of the pin hook into the drapery, to prevent the pin hook from moving relative to the drive member.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a front elevation of an apparatus embodying the invention;

FIG. 2 is a section taken along the line 2—2 on FIG. 1;

FIG. 3 is a diagrammatic top plan view of a portion of the apparatus showing the drive plate in the position it occupies in FIGS. 2, 4 and 8;

FIG. 4 is a view similar to FIG. 2 with the top plate removed;

FIG. 5 is a view of a portion of the apparatus similar to FIG. 2, with the top plate removed and showing the drive plate or member at its forward position where the drapery pin hook is completely inserted into the material of the drapery;

FIG. 6 is a view similar to FIG. 5 of the drive plate in its extreme rearward position at which it will receive another pin hook from the hook holder;

FIG. 7 is a cross section taken along the line 7—7 on FIG. 3;

FIG. 8 is an enlarged top plan view showing the drive plate and drapery pin hook in the initial position for insertion in drapery;

FIG. 9 is a section taken along the line 9—9 on FIG. 8;

FIG. 10 is a view similar to FIG. 8 showing the drive plate and the pin hook in its full forward position corresponding to FIG. 5;

FIG. 11 is a section taken along the line 11—11 on FIG. 10.

The apparatus particularly shown in the drawings is adapted to contain a supply of drapery pin hooks 10 and drive the pin portion 11 of such hooks into appropriate position in a drape placed upon or against the apparatus. Each drapery pin hook used in the apparatus includes the pin portion 11 that terminates in a forward point 12, the rear end of the pin portion merging into a curved web or loop 13, which, in turn, merges into an inner arm 14 extending generally parallel and adjacent to the pin portion 11. The rear 14a of the inner arm is inclined from the loop 13 toward the pin portion 11 to provide an opening 15 with the web and the rear of the pin portion.

The outer portion 16 of the inner arm 14 is bent outwardly at an angle, being inclined in a forward direction away from the pin portion 11. This bent arm merges into a rearwardly and outwardly bent portion 17 of an outer arm 18, the rearward projecting portion of which is generally parallel to the inner arm 14 of the hook and its pin portion 11. The two inclined inner and outer arm portions 16, 17 are of generally V-shape so that the drapery pin hook 10 may be suspended from and carried by a suitable hanger (not shown), in a known manner, for the purpose of supporting the drape from the hanger.

The apparatus includes a generally vertical frame or housing 19 having a plurality of inwardly extending bosses or lugs 20 provided with threaded bores 21. An upper supporting plate 22 extends between the walls of the housing or frame, resting upon the bosses 20 and having holes aligned with the threaded bores 21. A top or cover 23 is mounted upon the supporting plate 22, there being screws 24 extending through the cover and through the supporting plate for threaded reception within the holes 21 of the bosses, in order to secure the top 23 and the supporting plate 22 to the main frame or housing of the apparatus 19. The transverse horizontal wall 25 of the top is spaced from the supporting plate 22 to accommodate part of the drapery pin hook driving mechanism that inserts the pin portion of each hook in a drape, or similar item.

The drapery hook 10 is adapted to be received within a slotted and recessed portion 26 of a drive plate 27 slidably mounted upon the upper supporting plate 22. A top plate 28 is carried by the upper supporting plate in spaced relation thereto, the distance between the two plates being slightly greater than the thickness of the drive plate 27 so that the latter is appropriately guided and confined during its movement therebetween. The necessary spacing is secured by washers 29 disposed in alignment with threaded holes 30 in the upper supporting plate, the top plate 28 resting upon such washers. Suitable screws 31 extend through openings 32 in the top plate 28 and through the washers 29 into threaded holes 33 in the supporting plate 22 for attaching the top plate to the supporting plate.

The drive plate 27 is shiftable to a rearward position in alignment with a supply of hooks 10 carried above the top plate 28, as in a suitable holder 34 secured to the top plate 28 and extending upwardly through an opening 35 in the transverse wall 25 of the top member. The hooks 10 are held in the holder 34 in a vertical stack with the pin portions 11 disposed generally forwardly and the hanger arms 16, 17 generally rearwardly, the hooks tending to feed by gravity through an opening 36 in the top plate onto the drive plate 27, and, when the recess 26 of the latter is disposed in alignment with the stack of hooks 10, into such recess, and upon the top supporting plate 22.

The drive plate 27 has a recess 37 in its front margin to receive the pin and inner arm portions 11, 14 of the hook 10, this recess being enlarged in an inward direction to accommodate the curved web or loop portion 13 of the hook. The plate 27 is further cut out to provide an inclined edge 38 conforming to the inclined portion 16 of the inner arm of the hook, this edge terminating at another inclined edge 39, which conforms generally to the inclination of the inclined portion 17 of the outer arm 18 of the hook. The inclined edge just referred to merges into an inner slot portion 40 generally parallel to the front edge of the plate and which is adapted to accommodate the outer arm 18. It is to be noted that the forward recess 37 and rear slot portion 40, as well as the inclined edges 38, 39, provide a driving dog or lug 41 on the plate having the forward tapered sides 38, 39 and adapted to engage the inclined portions 16, 17 of the hook, to effect a coupling of the hook 10 to the plate 27, in order that the hook can be driven in a forward direction by the plate.

The driving plate 27 is disposed at the front portion of the supporting plate 22 and is guided along a predetermined path by a cam slot device 42 formed in the supporting plate of the frame. The drive plate 27 has a pair of spaced pins 43, 44 depending therefrom adapted to be received in the cam slot 42. The pins have a diameter substantially equal to the width of the slot, so that the shape of the slot 42 produces a corresponding movement of the drive plate 27 and of a hook 10 coupled thereto. As disclosed, the cam slot 42 has a rearward portion 45 inclined in a rearward direction away from the front of the apparatus. When the plate 27 is shifted in a rearward direction, the pins 43, 44 will ride rearwardly in the slot 42 and when the rear pin 44 engages the rear slot portion 45, it will angle the plate 27 to the position disclosed in FIG. 6, in which position the slotted and recess portion of the drive plate is disposed under the stack of pins 10 in the holder 34. When the slot recessed portions 26 of the plate 27 are disposed in alignment with a hook, the latter can drop thereinto from the vertical stack of hooks. To enable the hook 10 to slide along in between the top plate 28 and the supporting plate 22 of the apparatus, the drive plate 27 has substantially the same thickness as a hook.

The rearwardly curved cam slot portion 45 merges into a substantially straight forward slot portion 47 generally parallel to the front edge 48 of the supporting plate. As the drive plate 27 moves in the forward direction from the position shown in FIG. 6, it carries the pin hook 10 in a forward direction, the point 12 being disposed at a substantial angle to the front edge 48 of the apparatus and ready for insertion in a drape, or other material, disposed in the plane of the pin, such as illustrated in FIGS. 2, 4 and 8. As the plate 27 continues to move in the forward direction, it advances the point 12 of the pin through the fabric, whereupon the forward pin or follower 43 rides along the relatively straight slot portion 47, the rear pin or follower 44 moving from the rear curved slot portion toward and into the straight slot portion 47, disposing the pin portion 11 substantially parallel to the drape, the drive plate then occupying the position shown in FIGS. 5 and 10. When in this position, the pin 10 has completed its forward motion and the pin is disposed to one side of the top plate 28, as to the left as shown in the drawings, which will enable the hanger portions 16, 17, 18 of the hook to be lifted upwardly by the operator out of the drive plate 27 and the apparatus.

During the forward motion of the drive plate 27 after a pin 10 has entered its recess and slot portions 26, the drive plate slides under the stack of hooks in the holder 34 and prevents any other hooks from dropping from such stack. The imperforate or solid portion 27a of the drive plate remains under the stack of hooks at all times during its forward motion, and also during its rearward motion, until the recess and slotted portions 26 of the plate are again under the stack of hooks. After the drive plate 27 has reached its forward position, it is returned to its rearward position, being guided by the action of the followers 43, 44 moving in the cam slot 42 and being confined against vertical movement both in upward and downward directions by the top plate 28 and supporting plate 22.

As shown in the drawings, the drive plate 27 is reciprocated by a power device. An electric motor and gear reducer unit 50 is carried by a supporting plate 51 (FIG. 7) disposed within the housing 19 and suspended from the upper supporting plate 22 by a plurality of bolts 52 passing through spacer sleeves 53 extending between the plates 51, 22. The drive unit has a vertical drive shaft 54 to which a crank 55 is fixed, there being a crank pin 56 secured to this crank and pivotally connected to a connecting rod or link 57, the other end of which is pivotally mounted on one of the pins of followers, such as the forward pin or follower 43 secured to the drive plate 27 of the apparatus.

As the drive shaft 54 is rotated by the drive unit 50, the drive plate 27 is reciprocated through the agency of the crank 55, connecting rod 57 and the forward follower pin 43, the throw of the crank being such as to move the plate between its full forward position, disclosed in FIG. 5, and its rearward position, disclosed in FIG. 6.

The electric circuit to the motor unit is controlled by a suitable stop switch 58 and a suitable starting switch (not shown). The circuit is closed by the starting switch and the motor unit 50 will continue to operate until the stop switch 58 is actuated. This switch has a button 59 (FIGS. 3 and 7) projecting therefrom to be actuated by a leaf spring arm 60 secured to the switch itself and overlying the button, the arm extending in the path of travel of an extension 61 secured to and projecting from the crank 55, which is adapted to engage the free end of the arm 60 and actuate the stop button 59 for the purpose of opening the electric circuit to the motor unit and effect stopping of the apparatus, when the drive plate 27 has shifted the pin point 12 of a hook to a predetermined position, as just beyond the forward edge 48 of the apparatus, as disclosed in FIGS. 2, 3, 4 and 8, where the point 12 projects from the edge to enable it to be initially inserted into the drapery fabric by the operator at the desired part of the drape.

In the use of the apparatus, the drape can be placed upon a generally horizontal platform 62 extending forwardly from a vertical guard 63 that is yieldably mounted on the housing or frame 19 for vertical movement. This plate 63 is suitably guided in the frame and can be depressed until the drape seam is disposed opposite the pin point 12. Another guide or indicator 64 may be secured to the frame against which the seam of the drape can be placed to insure its proper alignment with the pin hook 10 to be inserted thereinto. In addition, the platform 62 may have a slidable gauge 65 mounted thereon to adjust the distance from an edge of a drape to the pin hook 10.

When the drape is properly located with respect to the apparatus and with the pin point 12 inserted against the drape seam, the starting switch (not shown) is closed to cause the drive plate 27 to move the drapery pin hook 10 into the seam, the drive plate then returning to its rearward position under a stack of hooks (FIG. 6) where the next lowermost hook will drop into the recess slot portion 26 of the drive plate, the drive plate continuing in a forward direction until the crank extension 61 again actuates the stop switch 58 to stop the drive unit 50 and arrest motion of the drive plate 27. The apparatus is now in condition for performance of another cycle of operation.

In the use of the apparatus, it is desired to prevent the drapery pin hook 10 from rocking or tilting relative to the drive plate 27 during insertion of the pin portion 11 of the hook into the drape. As the drive plate moves forward, the pin portion 11 of the hook engages the drape, and in view of the substantial angle that the pin portion makes to the drape, the point 12 should penetrate into the drapery material. However, the engagement of the pin point 12 against the fabric causes the drapery pin hook 10 to rock as the driving plate 27 moves forwardly and presses the pin against the drape, the pin portion 11 tending to flatten against the drape, which may result in the absence of penetration of the point 12 into the drape and the appropriate driving of the pin portion 11 into the interior of the drape. Under some circumstances, the pin portion 11 may actually remain externally of the drape seam and would not, therefore, be inserted in the drape.

By virtue of the present invention, the rocking or tilting of the drapery pin hook 10 with respect to the drive member or plate 27 is prevented. As shown in the drawings, the drive plate has a groove 80 extending upwardly from its lower face and a pin hook holder or retainer 81, in the form of a leaf spring, disposed in such groove and suitably secured to the drive plate, as by spot welding 82. The lower surface of the leaf spring 81 does not extend beyond the lower surface of the drive plate 27 to avoid interference with the sliding action of the drive plate upon the upper supporting plate 22. The forward portion 83 of the leaf spring extends under the enlarged recess 84 of the plate and under the loop or web 13 of a pin hook 10, when the latter has dropped into the plate recess and slot 26. This forward portion 83 inherently tends to spring away from the plate 27 in a downward direction and away from the drapery pin hook 10. However, while the drive plate 27 is disposed in a rearward position and, also, until it has moved forwardly sufficiently to insert the pin portion 11 of the hook into the drape or other material to a substantial extent, the forward portion 83 will be held by the upper supporting plate 22 in an upward position with a rounded upward projection 85 of the forward portion of the spring received within the opening 15 of the loop or web 13 of the pin hook. After the plate 27 has moved a substantial distance in inserting the pin portion 11 in the drape, the forward portion 83 of the spring moves over an opening 86 in the upper supporting plate 22 that permits such forward portion to inherently spring or move away from the loop or web 13, removing its rounded projection 85 from the loop opening 15 and disconnecting the retainer or holder 81 from the drapery pin hook 10, whereupon the drive plate 27 continues to shift the drapery pin hook completely into the drape, moving into the position disclosed in FIG. 5.

During the action of the drive plate 27 in initially pressing the point 12 of the drapery pin hook against the drapery, which occurs when the drive plate is in the position disclosed in FIGS. 2, 4, 8 and 9, the upper supporting plate 22 is holding the forward portion 83 of the spring retainer or holder 81 in an upward position, with its projection 85 disposed within the loop 13 of the hook 10. Any tendency for the drapery pin hook 10 to tilt or rock relative to the drive plate 27 is precluded, inasmuch as the loop 13 cannot move in a forward direction towards the forward edge 48 of the machine and relative to the drive plate, since it is prevented from doing so by the projection 85 of the leaf spring retainer. Since the loop 13 cannot move from the drive plate 27, it remains coupled thereto. The pin portion 11 of the drapery pin hook cannot flatten against the drape, and, accordingly, it will remain at a substantial angle thereto, the drive plate 27 forcing the point 12 of the pin into and through the drapery material. The loop 13 remains positively coupled to the drive plate 27 during a large portion of the forward driving movement of the pin portion 11 in the drapery material, and until the forward part 83 of the retainer member 81 is moved above the upper supporting plate opening 86, whereupon it can spring downwardly, the dog or lug 41 on the drive member 22 continuing to bear against the hanger portion 16, 17 of the hook and forcing the pin portion 11 to its fullest extent into the drapery. This forwardmost driving position is illustrated in FIGS. 5, 10 and 11, from which it is seen that the projection 85 of the leaf spring holder or retainer 81 has sprung downwardly out of the loop 13, disconnecting the drive plate 27 therefrom and allowing the latter to move to its rearward position, in which the forward portion 83 of the holder again rides upon the upper supporting plate 22 to force its projection 85 upwardly into the enlarged recess 84 of the plate. When the plate is again in alignment with the stack of hooks in the holder 34, another hook will drop into its recess 26, with the loop or web 13 positioned about the projection 85 of the retainer member.

The plate then moves forwardly until the point 12 of the pin is again at the position illustrated in FIGS. 2, 4, 8 and 9, whereupon the drive plate stops. At this time, the retainer 81 is still held by the upper supporting plate 22 with its projection 85 disposed within the loop 13 of the hook. Upon restarting of the apparatus with a drape bearing against the pin point 12, the drive plate 27 will force the point into the drape and the pin portion 11 along the interior of the drape, the loop or web 13 remaining coupled to the plate 27 by virtue of the fact that the projection 85 is still disposed within the loop 13, until a substantial insertion and movement of the pin portion 11 of the hook into the drape has occurred, the projection 85 only dropping out of the loop 13 after the forward portion 83 of the spring has been disposed substantially over the upper supporting plate opening 84.

I claim:

1. In apparatus for inserting hooks in drapes and the like: a drive member adapted to receive a hook having a pin portion; means operatively connected to said drive member to shift said drive member between a rearward position in which the drive member receives a hook and a forward position in which the pin portion of the hook is inserted in the drape; and means shiftable substantially normal to the plane of movement of said drive member for preventing movement of the hook with respect to the drive member while said drive member is inserting the pin portion in the drape.

2. In apparatus for inserting hooks in drapes and the like: a drive member adapted to receive a hook having a pin portion; means operatively connected to said drive member to shift said drive member between a rearward position in which the drive member receives a hook and a forward position in which the pin portion of the hook is inserted in the drape; and means secured to the drive member and having a retainer portion shiftable substantially normal to the plane of movement of said drive member into engagement with the hook for preventing movement of the hook with respect to the drive member while said drive member is inserting the pin portion in the drape.

3. In apparatus for inserting hooks in drapes and the like: a drive member adapted to receive a hook having a pin portion; means operatively connected to said drive member to shift said drive member between a rearward position in which the drive member receives a hook and a forward position in which the pin portion of the hook is inserted in the drape; means secured to the drive member and having a retainer portion shiftable substantially normal to the plane of movement of said drive member into engagement with the hook for preventing movement of the hook with respect to the drive member while said drive member is inserting the pin portion in the drape; and means for shifting said retainer portion into such engagement with the hook.

4. In apparatus for inserting hooks in drapes and the like: a drive member adapted to receive a hook having a pin portion merging into a loop portion; means operatively connected to said drive member to shift said drive member between a rearward position in which the drive member receives a hook and a forward position in which the pin portion of the hook is inserted in the drape; and means shiftable substantially normal to the plane of movement of said drive member into engagement with said loop portion for preventing movement of the loop portion with respect to the drive member while said drive member is inserting the pin portion in the drape.

5. In apparatus for inserting hooks in drapes and the like: a drive member adapted to receive a hook having a pin portion merging into a loop portion; means operatively connected to said drive member to shift said drive member between a rearward position in which the drive member receives a hook and a forward position in which the pin portion of the hook is inserted in the drape; and means for securing the loop portion of the hook to said drive member while the drive member is inserting the pin portion in the drape.

6. In apparatus for inserting hooks in drapes and the like: a drive member adapted to receive a hook having a pin portion merging into a loop portion; means operatively connected to said drive member to shift said drive member between a rearward position in which the drive member receives a hook and a forward position in which the pin portion of the hook is inserted in the drape; and means secured to the drive member and having a retainer portion shiftable substantially normal to the plane of movement of said drive member into engagement with the loop portion of the hook for preventing movement of the loop portion with respect to the drive member while said drive member is inserting the pin portion in the drape.

7. In apparatus for inserting hooks in drapes and the like: a drive member adapted to receive a hook having a pin portion; means operatively connected to said drive member to shift said drive member between a rearward position in which the drive member receives a hook and a forward position in which the pin portion of the hook is inserted in the drape; and a leaf spring secured to the drive member and engageable with the hook for preventing movement of the hook with respect to the drive member while said drive member is inserting the pin portion in the drape.

8. In apparatus for inserting hooks in drapes and the like: a drive member adapted to receive a hook having a pin portion; means operatively connected to said drive member to shift said drive member between a rearward position in which the drive member receives a hook and a forward position in which the pin portion of the hook is inserted in the drape; a leaf spring secured to the drive member and engageable with the hook for preventing movement of the hook with respect to the drive member while said drive member is inserting the pin portion in the drape; and means for shifting said spring into a location for engagement with the hook.

9. In apparatus for inserting hooks in drapes and the like: a drive member adapted to receive a hook having a pin portion merging into a loop portion; means operatively connected to said drive member to shift said drive member between a rearward position in which the drive member receives a hook and a forward position in which the pin portion of the hook is inserted in the drape; and a leaf spring secured to the drive member and having a portion engageable with the loop portion for securing the loop portion to said drive member while said drive member is inserting the pin portion in the drape.

10. In apparatus for inserting hooks in drapes and the like: a drive member adapted to receive a hook having a pin portion merging into a loop portion; means operatively connected to said drive member to shift said drive member between a rearward position in which the drive member receives a hook and a forward position in which the pin portion of the hook is inserted in the drape; and a leaf spring secured to the drive member and having a retainer portion normally disposed out of engagement with the loop portion and deflectable into engagement with the loop portion to secure the loop portion to said drive member while said drive member is inserting the pin portion in the drape.

11. In apparatus for inserting hooks in drapes and the like: a drive member adapted to receive a hook having a pin portion merging into a loop portion; means operatively connected to said drive member to shift said drive member between a rearward position in which the drive member receives a hook and a forward position in which the pin portion of the hook is inserted in the drape; and a leaf spring secured to the drive member and having a retainer portion normally disposed out of engagement with the loop portion and deflectable into engagement with the loop portion to secure the loop portion to said drive member while said drive member is inserting the pin portion in the drape, said retainer portion including means adapted to enter the loop portion of the hook.

12. In apparatus for inserting hooks in drapes and the like: a drive member adapted to receive a hook having a pin portion merging into a loop portion and to insert the pin portion of the hook in the drape; and means for releasably securing the loop portion of the hook to said drive member.

13. In apparatus for inserting hooks in drapes and the like: a drive member adapted to receive a hook having a pin portion merging into a loop portion and to insert the pin portion of the hook in the drape; and means adapted to enter the loop portion of the hook for releasably securing the loop portion to said drive member.

14. In apparatus for inserting hooks in drapes and the like: a drive member adapted to receive a hook having a pin portion merging into a loop portion and to insert the pin portion of the hook in the drape; and means secured to said drive member and adapted to enter the loop portion of the hook for releasably securing the loop portion to said drive member.

15. In apparatus for inserting hooks in drapes and the like: a stationary support; a drive member mounted on said support and adapted to receive a hook having a pin portion; means operatively connected to said drive member to shift said drive member between a rearward position in which the drive member receives a hook and a forward position in which the pin portion of the hook is inserted in the drape; a leaf spring secured to the drive member and engageable with the hook for preventing movement of the hook with respect to the drive member while the drive member is inserting the pin portion in the drape; said support having means thereon engageable with said spring for shifting said spring into a location for engagement with the hook.

16. In apparatus for inserting hooks in drapes and the like: a stationary support; a drive member mounted on said support and adapted to receive a hook having a pin portion merging into a loop portion; means operatively connected to said drive member to shift said drive member on said support between a rearward position in which the drive member receives a hook and a forward position in which the pin portion of the hook is inserted in the drape; a leaf spring secured to the drive member and having a retainer portion normally disposed out of engagement with the loop portion and deflectable into engagement with the loop portion to secure the loop portion to said drive member while said drive member is inserting the pin portion in the drape; said support having means thereon engageable with said retainer portion of said spring for deflecting said spring into a location for engagement with the loop portion of the hook.

17. In apparatus for inserting hooks in drapes and the like: a stationary support; a drive member mounted on said support and adapted to receive a hook having a pin portion merging into a loop portion; means operatively connected to said drive member to shift said drive member on said support between a rearward position in which the drive member receives a hook and a forward position in which the pin portion of the hook is inserted in the drape; a leaf spring secured to the drive member and having a retainer portion normally disposed out of engagement with the loop portion and deflectable into engagement with the loop portion to secure the loop portion to said drive member while said drive member is inserting the pin portion in the drape; said support having means thereon engageable with said retainer portion of said spring for deflecting said spring into a location for engagement with the loop portion of the hook; said support having an opening into which said retainer portion can deflect from engagement with the loop portion of the hook during forward movement of said drive member and spring.

18. In apparatus for inserting hooks in drapes and the like: a drive member adapted to receive a hook having a pin portion merging into a loop portion and to insert the pin portion of the hook in the drape; and a spring engageable with the hook for releasably securing the hook to said drive member.

19. In apparatus for inserting hooks in drapes and the like: a drive member adapted to receive a hook having a pin portion merging into a loop portion and to insert the pin portion of the hook in the drape; and a leaf spring adapted to enter the loop portion of the hook for releasably securing the loop portion to said drive member.

No references cited.